Patented Feb. 9, 1937

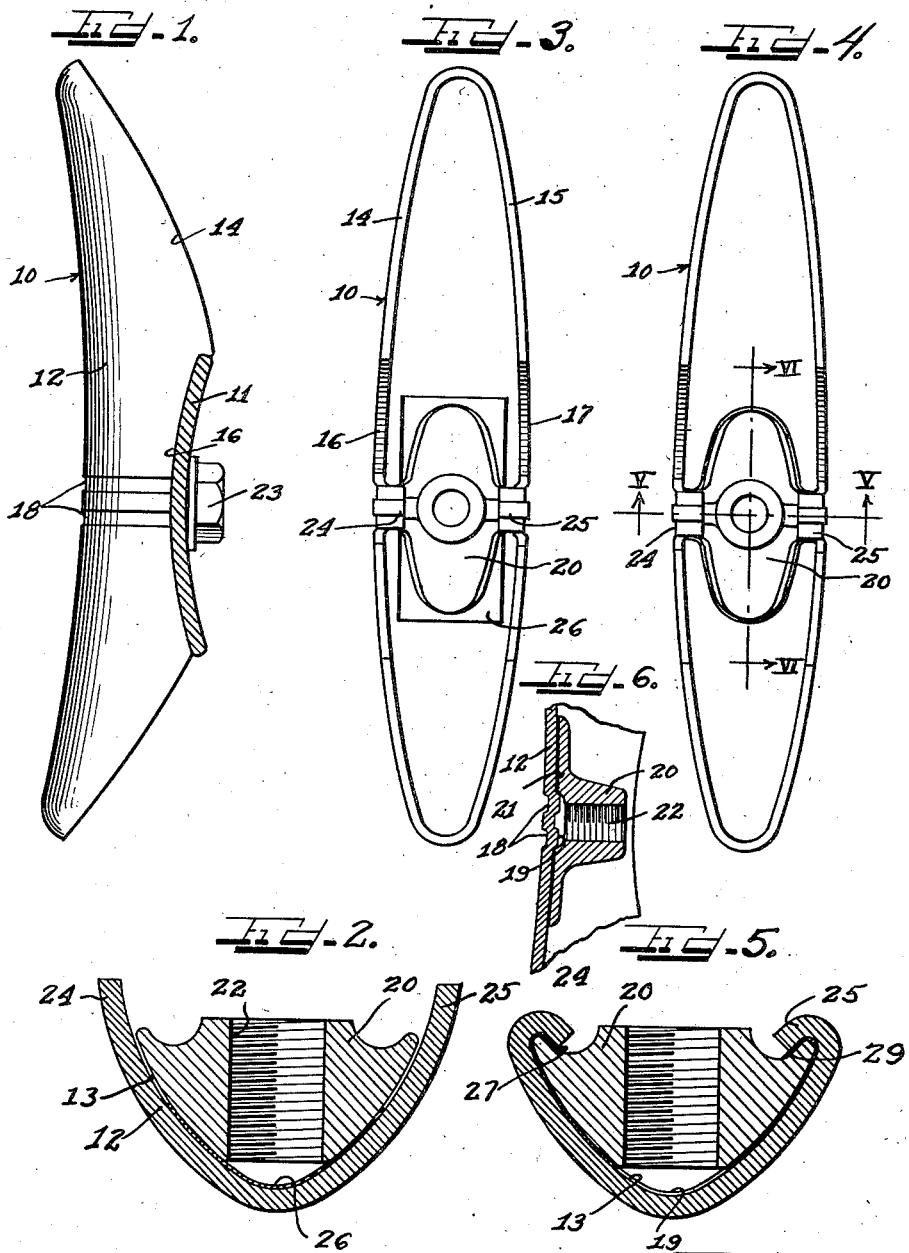

2,070,424

UNITED STATES PATENT OFFICE 2,070,424

METHOD OF MAKING BUMPER GUARDS

Charles R. Duncan, Waukegan, Ill., assignor to Oakes Products Corporation, North Chicago, Ill., a corporation of Michigan Application May 3, 1935, Serial No. 19,549

3 Claims. (Cl. 29—152)

This invention relates to a method of making bumper guards. More particularly the invention relates to the manufacture of the type of bumper guards that are adapted to be attached in vertical position to a horizontally extending bumper or fender bar, such as those used on automobiles.

It is an important object of this invention to provide a method of making bumper guards that includes the assembling of an attaching member in interlocking relation with the fender portion of the guard and then welding the parts together, preferably in a reducing or hydrogen atmosphere.

Other and further important objects of this invention will be apparent from the disclosures in the specification and the accompanying drawing.

This invention (in a preferred form) is illustrated in the drawing and hereinafter more fully described.

On the drawing:

Figure 1 is a side elevational view of a bumper guard embodying the principles of my invention, with the bumper bar to which it is attached in cross section.

Figure 2 is an enlarged cross sectional view of a bumper guard at one stage in its manufacture.

Figure 3 is a rear elevational view of the bumper guard at another stage in its manufacture.

Figure 4 is a rear elevational view of the finished bumper guard.

Figure 5 is an enlarged sectional view taken substantially on the line V—V of Fig. 4.

Figure 6 is a fragmentary sectional view taken substantially on the line VI—VI of Fig. 4.

As shown on the drawing:

The reference numeral 10 indicates generally a bumper guard embodying the principles of my invention and adapted to be attached in vertical position to a horizontally disposed bumper bar or the like, designated by the reference numeral 11. Said bumper guard 10 comprises a body or fender portion 12, which may suitably be formed from sheet metal by a die stamping operation performed on a punch press or the like.

Said shell 12 is so formed as to be of a generally U-shaped cross section (Figs. 2 and 5) with a rear concave surface 13. The edges 14 and 15 of the fender portion 12 curve rearwardly from the ends of said portion and are recessed intermediate the ends as at 16 and 17 to receive and conform with the curved face of the bumper bar 11.

The shell 12 is also provided with transversely extending grooves 18 in its front surface, forming corresponding beads or raised portions 19 on the inner or concave surface of the shell. These raised portions 19 serve to assist in the positioning of an attaching member, or boss 20, the surface 21 of said boss being curved and grooved to conform with the curvature of the inner face 13 and receive the raised portions 19. The boss 20 is provided with a threaded boss 22 extending therethrough and adapted to receive the threaded end of a bolt 23 for attaching the bumper guard to the bar 11.

At the grooved portion of the shell or fender member, ears 24 and 25 are formed along the recessed edges 16 and 17, respectively. Initially, said ears 24 and 25 form integral continuations of the shell portion and are of conforming curvature. In assembling the attaching boss 20 in the fender portion, however, the ears 24 and 25 are bent inwardly and downwardly (Fig. 5) over the lateral edges of the boss 20 to hold the same firmly in place. This will be more fully understood from the following description of the method of assembling the parts of my bumper guard.

As shown in Figs. 2 and 3, a piece 26 of thin sheet brazing metal or alloy is first laid against the concave face 13 of the shell at the point of attachment of the boss 20. The boss 20 is then inserted into position with its grooves in registry with the raised or ribbed portions 19 and the upstanding ears 24 are bent inwardly and downwardly against the top faces of the boss 20 to press said boss firmly into contact with the brazing material 26. As shown, the brazing material comprises a rectangularly shaped sheet of thin gauge metal, such as copper or brass. It is not necessary that the shape of the brazing shim 26 correspond with the shape of the face of the attaching boss 20, or that the brazing shim extend into contact with all of the surface of the two parts that are to be welded together. When the temperature is raised above the melting point of the brazing material, the material flows by capillarity between the closely abutting surfaces and even up and around the inner surfaces of the bent over ears 24 and 25, as at 27 and 29, respectively (Fig. 5).

The welding is preferably carried out in a reducing atmosphere, which may suitably be hydrogen or a mixture of gases relatively rich in hydrogen, carbon monoxide and nitrogen. Comparatively little oxygen should be present in the atmosphere of the welding furnace if a satisfactory weld is to be obtained and the formation of scale prevented. The assembled parts of my bumper guard may be placed on a traveling conveyor, with the guards resting upon shoes or other supporting surfaces so that the attaching bosses 20 are uppermost. The assembled units are then run into a furnace having a reducing or hydrogen atmosphere heated to a temperature sufficiently high to effect the welding operation. Where brass shims are used, the temperature may be in the neighborhood of 1800 to 2000° F. and slightly higher for copper shims. At these temperatures and under reducing conditions, the brazing metal or alloy, upon melting, wets the surfaces with which it comes into contact and flows by capillary action between the closely adjacent surfaces of the shell and attaching boss. When the welding operation is complete, the bumper guards are removed from the furnace through a cooling chamber that is also supplied with a reducing or non-oxidizing atmosphere so that the metal of the bumper guard may reach a sufficiently low temperature to prevent oxidation during the cooling down period.

It will be found that by using a welding method such as described, the attaching boss 20 is permanently and strongly bonded to the fender portion 12. While the bent over ears 24 and 25 are not necessary to the retaining of the attaching boss in place, during use, they do serve as temporary positioning and retaining means for the boss and facilitate the welding operations.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The method of making a bumper guard, which comprises stamping a fender portion from sheet metal to form a rear concavity, positioning an attaching boss in said concavity with brazing metal therebetween, deforming an integral portion of said fender portion into engagement with said attaching boss to secure the same in place and heating the assembled parts to a temperature sufficiently high to effect a weld by means of said brazing metal.

2. The method of making a bumper guard, which comprises stamping sheet metal to form a shell having a rear concave face with upstanding ears extending from the lateral edges thereof, positioning an attaching boss on the rear face with a brazing shim therebetween, bending said ears over into contact with said boss to effect close engagement of the contacting surfaces of said shell, shim and boss and subjecting the whole to a welding temperature to weld said boss to said rear face and said ears.

3. The method of making a bumper guard, which comprises stamping a fender portion out of sheet metal to provide a rear concave face and transversely extending grooves, with ears extending outwardly from the lateral edges of said shell, providing an attaching member with a face conforming with said grooved rear face, positioning said member against said rear face with brazing metal therebetween, bending said ears into engagement with said member to firmly hold the same in place and subjecting the assembled parts to a welding temperature to melt said brazing metal and effect a weld.

CHARLES R. DUNCAN.